(12) United States Patent
Torsner et al.

(10) Patent No.: US 8,565,126 B2
(45) Date of Patent: Oct. 22, 2013

(54) METHOD AND A TRANSCEIVER FOR REDUCING RETRANSMISSIONS IN A TELECOMMUNICATIONS SYSTEM

(75) Inventors: Per Johan Torsner, Masaby (FI); Mats Sagfors, Kyrkslatt (FI); Anna Larmo, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 12/933,245

(22) PCT Filed: Oct. 10, 2008

(86) PCT No.: PCT/SE2008/051158
§ 371 (c)(1),
(2), (4) Date: Sep. 17, 2010

(87) PCT Pub. No.: WO2009/116914
PCT Pub. Date: Sep. 24, 2009

(65) Prior Publication Data
US 2011/0013567 A1    Jan. 20, 2011

Related U.S. Application Data

(60) Provisional application No. 61/038,232, filed on Mar. 20, 2008.

(51) Int. Cl.
*H04B 7/005* (2006.01)

(52) U.S. Cl.
USPC ............................................ 370/278; 370/282

(58) Field of Classification Search
None
See application file for complete search history.

(56) References Cited

U.S. PATENT DOCUMENTS

| | | | |
|---|---|---|---|
| 8,219,867 B2 * | 7/2012 | Meyer et al. ................. | 714/748 |
| 2002/0015385 A1 * | 2/2002 | Yi et al. ........................ | 370/236 |
| 2006/0251105 A1 * | 11/2006 | Kim et al. .................... | 370/449 |
| 2008/0045219 A1 * | 2/2008 | Terry ............................. | 455/436 |
| 2008/0095116 A1 * | 4/2008 | Kim et al. .................... | 370/331 |
| 2008/0101608 A1 * | 5/2008 | Jiang et al. .................. | 380/270 |

FOREIGN PATENT DOCUMENTS

EP    0658028 A2    6/1995

OTHER PUBLICATIONS

3GPP TS 36.322 V8.0.0 (Dec. 2007), Technical Specification Group Radio Access Network; Evolved Universal Terrestrial Radio Access (E-UTRA) Radio Link Control (RLC) protocol specification.*
Chun, B.-G. et al. "Auxiliary Timeout and Selective Packet Discard Schemes to Improve TCP Performance in PCN Environment." 1997 IEEE International Conference on Communications (ICC '97), Montreal, QC, Canada, Jun. 8-12, 1997, pp. 381-385.
Cohen, R. "An Improved SSCOP-like Scheme for Avoiding Unnecessary Retransmissions and Achieving Ideal Throughput." INFOCOM '96, 15th Annual Joint Conference on the IEEE Computer Societies, San Fransisco, CA, US, vol. 2, Mar. 24-28, 1996, pp. 855-862.

* cited by examiner

*Primary Examiner* — Eunsook Choi
(74) *Attorney, Agent, or Firm* — Coats & Bennett, P.L.L.C.

(57) ABSTRACT

The present invention relates to a method and to a transceiver (100) of a telecommunications system capable in exchanging protocol data units (PDUs) with another transceiver(s). Each PDU being identified using a sequence number. The transceiver, according to the present invention, is arranged to receive from the other transceiver a status report indicating positively acknowledged PDUs and negatively acknowledged PDUs. The transceiver (100) is further configured to compare sequence numbers in the report with previously acquired sequence numbers from previous reports and to prevent retransmissions of one or several PDUs based on the comparison.

14 Claims, 7 Drawing Sheets

METHOD AND A TRANSCEIVER FOR REDUCING RETRANSMISSIONS IN A TELECOMMUNICATIONS SYSTEM

TECHNICAL FIELD

The present invention relates generally to the field of wireless communications, and, more particularly, to a method and a transceiver for reducing retransmission attempts of data units between said transceiver and another transceiver.

BACKGROUND

The 3$^{rd}$ Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach a data rates of about 100 Mbps on the downlink and about 50 Mbps on the uplink.

The 3GPP LTE system will include protocols intended to minimize the loss of data transmitted through the radio link between entities in the network. One of these protocols is known as the radio link control (RLC) protocol used for communication between user equipments in a cell and a controlling node or nodes, e.g. a radio base station(s) of the cell. In LTE, a base station is also known as eNB (enhanced/evolved NodeB) or eNodeB which performs the functions of a conventional radio access network (RNC) node of a UMTS Node B. In addition, eNBs in LTE will interact directly with the core network and with other eNBs The RLC protocol can operate in different modes, e.g. a acknowledged mode (AM) and a unacknowledged mode (UM). In LTE, the RLC is used to cover for residual errors caused by the lower layer protocol, when run in AM mode, and to perform in-sequence delivery of protocol data units (PDUs) also when run in UM mode.

The in-sequence delivery of PDUs is required, because the lower layer in LTE uses Hybrid automatic resend request (HARQ) protocol, which may cause the data to be delivered to RLC in a different order then in which it was originally given to the lower layer. HARQ is generally used for facilitating fast error detection and correction. HARQ is known as a stop and wait protocol; subsequent transmission can take place only after receiving ACK/NACK (acknowledgment(s)/negative-acknowledgement(s)). In case an ACK is received a new transmission is done else a retransmission is done. ACK indicates to the transmitting side that data has been correctly received. NACK indicates to the transmitting side that data has not been correctly received i.e. received only partly or not at all.

As mentioned earlier, the RLC supports the RLC UM mode. For each PDU intended to be transmitted, a PDU header includes a sequence number such that the receiving side knows which PDU had been lost during transmission. When considered from the transmitting side, if the transmitting side operates in UM mode, it does not check whether the receiving side correctly received the corresponding PDU, and once a PDU is transmitted, it is not re-transmitted. When considered from the receiving side operating in RLC UM mode, the PDUs that have been missing are determined by referring to the sequence numbers of the received PDUs, and for those PDUs determined to be missing, waiting is performed only until a special re-ordering timer expires. PDUs are thus delivered in-sequence as long as they are received while the re-ordering timer is running. When the re-ordering timer expires, out-of-sequence delivery is performed, and the missing PDUs are considered lost.

The RLC AM mode includes the sending of PDUs over the radio interface carrying higher layer data, reordering of those PDUs in the receiving side, detecting lost PDUs and requesting retransmissions for those PDUs that are considered lost. Each PDU is also here identified using a sequence number (SN). Therefore, the reordering of data PDUs is performed based on the SN which is included in the RLC header. The retransmissions of lost PDUs are requested by the receiving side in a special control PDU, called the RLC status PDUs, status PDU, status PDU report, status report or simply a STATUS. The status PDU is sent from the receiving side to the transmitting side. The status PDU indicates ACKs concerning correctly received data. The status PDU also indicates NACKs concerning data that has not been correctly received, i.e. received only partly or not at all. The ACKs and NACKs in the RLC status PDU are thus sent as PDU sequence numbers in order to identify the corresponding PDUs in question.

Contrary to a data PDU, the status PDU is not numbered, i.e. it does not include a SN. Therefore, the status PDU cannot be reordered in the same way as the data PDUs. The lack of reordering for the status PDUs in RLC causes them to be received sometimes out of order. This means that the status PDUs arrive to the RLC transmitting side in an order which is different from the order in which they where transmitted from the RLC receiving side. In the prior art RLC specification described in the 3GPP technical specification TS 36.322 version 8.1.0, it is specified that a RLC transmitter should re-transmit PDUs that are marked as missing in a status report. However, this prior art fails in describing the action to be performed in case an out of order reception of a status PDU is observed. A drawback with having an out of order reception of a status PDU is that it leads to that a previously acknowledged PDU can be later negatively acknowledged by an older status PDU. This will lead to unnecessary retransmission of previously acknowledged PDUs. Furthermore, unnecessary retransmissions result is a waste of radio resources and an increase in interference in the network.

SUMMARY

It is thus an object of the exemplary embodiments of the present invention to address the above mentioned problems and to provide a method and an apparatus corresponding to a transceiver, that reduce the number of PDU retransmission attempts between said transceiver and another transceiver, thus minimizing unnecessary resource usage and interference in the network.

According to a first aspect of embodiments of the present invention, the above stated problem is solved by means of a method in a transceiver of a telecommunications system wherein protocol data units, PDU, are exchangeable between the transceiver and another transceiver. Each PDU is identified using a sequence number (SN). The method comprises the steps of: receiving a status PDU report from the other transceiver. The report indicating/comprising, for each negatively acknowledged (NACKed) PDU a corresponding NACKed SN and further indicating/comprising for each positively acknowledged (ACKed) PDU a corresponding ACKed SN. The method further comprises the steps of comparing each NACKed SN in the received report with previously acquired ACKed SNs from previous or earlier report(s) and preventing the retransmission of each NACKed PDU having a NACKed SN that has already been ACKed in a previous or earlier report.

According to a second aspect of embodiments of the present invention, the above stated problem is solved by means of a transceiver of a telecommunications system wherein PDUs are exchangeable between the transceiver and another transceiver. Each PDU being identified using a SN. The transceiver is configured to receive a status PDU report from the other transceiver. The report comprises/indicates for each NACKed PDU a corresponding NACKed SN and for each ACKed PDU a corresponding ACKed SN. The transceiver is also configured to compare each NACKed SN with previously acquired ACKed SNs in previous or earlier report(s) and to prevent the retransmission of each NACKed PDU having a SN that has already been ACKed in a previous or earlier report.

An advantage with the present invention is to reduce the number of unnecessary PDU retransmission attempts between a transceiver and another transceiver in a network.

Another advantage with the present invention is to reduce waste of radio resources in the network.

Yet another advantage with the present invention is to reduce the amount of interference created in the network that may be caused by unnecessary retransmissions.

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a communications network based on the third generation (3G) long term evolution (LTE) concept. It should be noted that the present invention is not restricted to 3G LTE but can be applicable in other wireless systems that employ the transmission of RLC status PDUs, such as WiMAX (worldwide interoperability for microwave access), or HSPA (high speed packet access) or WCDMA (wideband code division multiple access).

Figure 1:
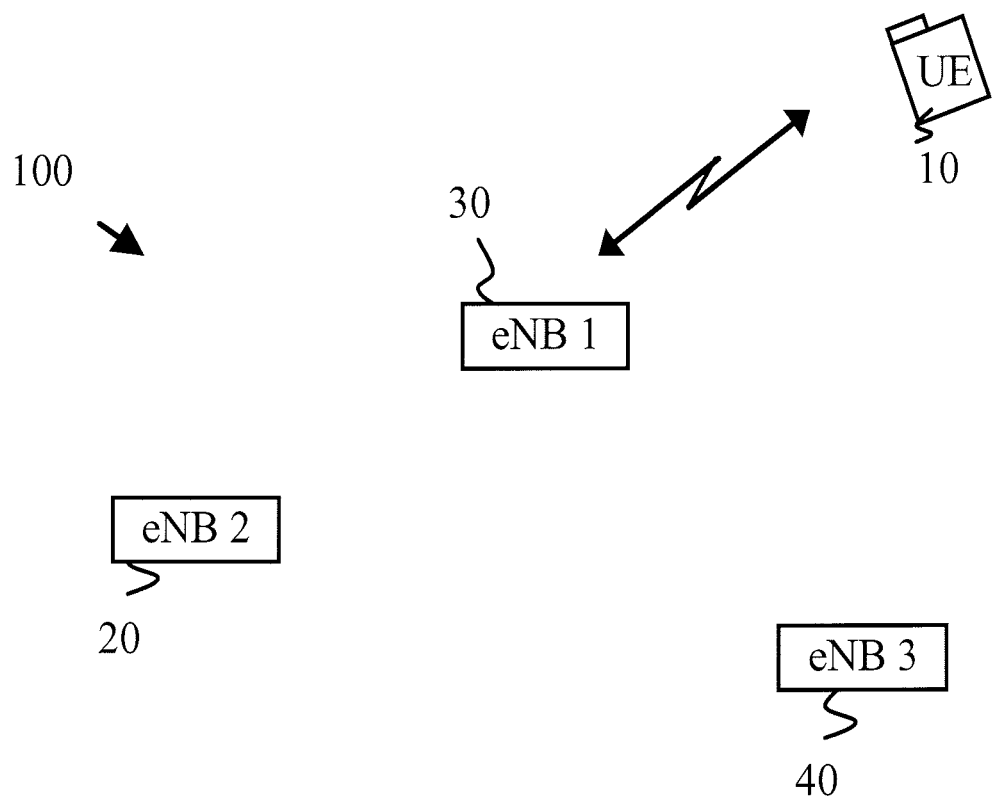
FIG. 1 is a diagram illustrating an example of a wireless network system wherein exemplary embodiments of the present invention can be applied.

Referring to FIG. 1, there is illustrated a block diagram of an exemplary wireless telecommunications network system 100 in which the different exemplary embodiment of the present invention may be applied. Note that the system depicted in FIG. 1 only shows transceivers or entities that are necessary for understanding the different exemplary embodiments of the present invention. As shown, the system 100 which is here considered to represent a 3GPP LTE system, comprises a transceiver 10 acting as a user equipment (UE) and radio base stations denoted eNB 1 30, eNB 2, 20 and eNB 3 40. One of the functions of a eNB is to control traffic to and from UEs in a cell. The UE 10 is suitable to be used as a mobile phone, a wireless terminal, a laptop, a personal computer, a personal digital assistant, a voice over internet protocol (VoIP) capable phone or any other 3GPP LTE capable equipment. Traffic between a eNB and the UE 10 is referred to as downlink (DL) traffic and traffic between the UE 10 and a eNB is referred to as uplink (UL) traffic. Note that in FIG. 1, the UE 10 is assumed to be served by eNB 1 although any one of the other eNBs 20, 40 may serve the UE 10.

Generally in LTE systems, the radio link control (RLC) protocol is used for communication between the eNB and the UE (or UEs) in a cell that is served by the eNB. According to the RLC protocol, traffic between two transceivers, i.e. a UE and its eNB, is transmitted in so called protocol data units, PDUs over the radio interface. Each PDU is assigned an identifier known as a sequence number (SN), which allows both the transmitting side (eNB or UE) and the receiving side (UE or eNB) to identify a PDU thus achieving a correct reordering of the PDUs at the receiving side.

As mentioned earlier, a RLC status PDU is sent from the receiving side to the transmitting side in order to indicate which data PDU(s) were successfully received, unsuccessfully received and/or lost. A successfully received PDU is indicated with an acknowledgment (ACK) in the status PDU, whereas an unsuccessfully received and/or lost PDU is indicated by a non-acknowledgment or a negatively acknowledgment (NACK) in the status PDU. The ACKs and NACKs in the RLC status PDU are sent as PDU sequence numbers. It should be noted that the status PDU can be triggered when so requested by the transmitting side with a special POLL bit, or when a missing PDU is detected. In addition, the status PDU may be sent when it is triggered, if a special status prohibit timer is not running, or upon expiry of a timer.

Contrary to the data PDU, the RLC status PDU or status report is not numbered, i.e. it is not identified using a sequence number and thus the status PDU report cannot be re-ordered in the same way as the data PDU. The lack of re-ordering for the status PDUs thus causes them to be received sometimes out of order. This means that status PDUs may arrive to the RLC transmitting side in an order which is different from the order in which they where transmitted from the RLC receiving side.

In the description below, it will be assumed that data PDUs are sent by a transceiver corresponding to a eNB, i.e. in DL direction, and the status PDU(s) are sent by a UE, i.e. in UL direction. However, it should be noted that this is merely an example intended to facilitate the understanding of an exemplary embodiment of the present invention. The present invention is also applicable in the other direction, i.e. data PDUs are transmitted from a UE in UL and status PDUs are transmitted from the eNB in DL. Furthermore, the different RLC entities discussed here can operate in any RLC mode, i.e. unacknowledged mode (UM), acknowledged mode (AM) mode or transparent mode (TM). However, the RLC AM operation is hereinafter considered more interesting in the context of the description.

Figure 2:
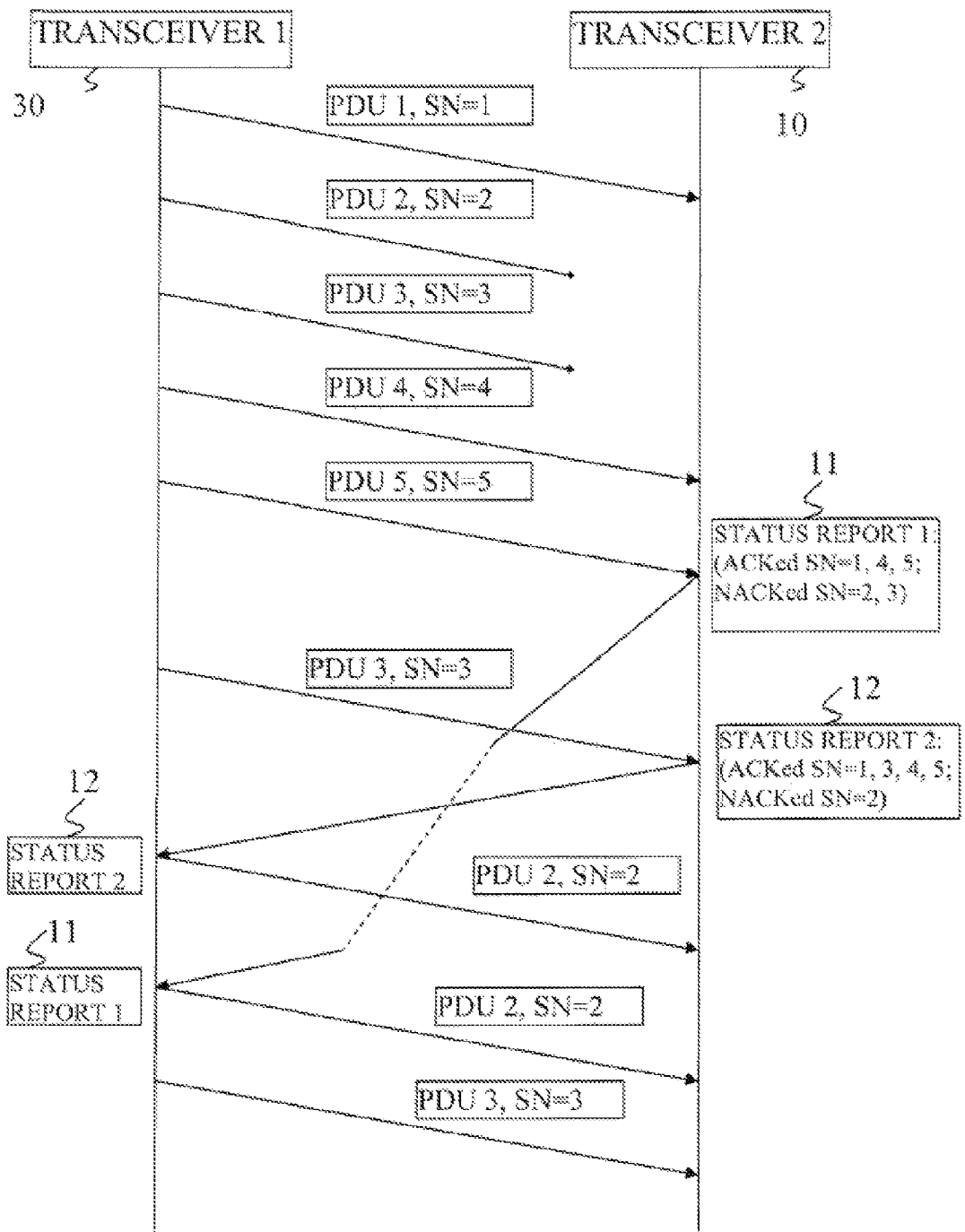
FIG. 2 is a flow diagram of a prior art system including a first transceiver (user equipment or eNB) and second transceiver (eNB or user equipment), where PDUs are exchanged between the transceivers.

Referring to FIG. 2, there is illustrated a flowchart wherein a first transceiver 30 denoted Transceiver 1, acting here as a eNB is sending a sequence of PDUs to a second transceiver 10 denoted Transceiver 2, acting here as a UE. Transceiver 1 30 and Transceiver 2 10 are RLC entities and are capable in supporting the HARQ (Hybrid Automatic Repeat Request) protocol. In addition, both transceivers 30, 10 may also support the HARQ protocol that can operate with parallel processes. By parallel processes is meant that a new transmission can start although the feedback for the previous one has not yet been received.

Referring back to FIG. 2, Transceiver 30 is shown transmitting a sequence of PDUs numbered 1, 2, 3, 4, and 5. In this exemplary scenario it is assumed that PDU 1 has a sequence number (SN) equal to 1; PDU 2 has SN=2; PDU 3 has SN=3; PDU 4 has SN=4 and PDU 5 has SN=5. Note that the numbering and the amount of PDUs transmitted between Transceiver 1 and Transceiver 2 are illustrative only. In FIG. 2 it is also assumed that PDU 1 has been successfully received by Transceiver 2 but PDU 2 (SN=2) and PDU 3 (SN=3) have been unsuccessfully received due to e.g. lost during the transmission or that they have not been properly receiver. As shown in FIG. 2, Transceiver 1 30 sends PDU 4 (SN=4) and PDU 5 (SN=5) which are assumed to be properly received. Upon reception of PDU 5 (SN=5), Transceiver 2 prepares a status report, i.e. a status PDU denoted status report 1 11 where it is indicated which PDUs were positively acknowledged (ACKed) and which PDUs where negatively acknowledged (NACKed). Note that the amount of PDUs required to send a status PDU from transceiver 2 10 is a design parameter and the present invention is not restricted to any particular parameter. As shown, status report 1 identifies SN=1, 4, and 5 as ACKed PDUs, i.e. PDU 1, 4 and 5; and identifies SN=2, 3 as NACKed PDUs, i.e. PDUs 2 and 3. Transceiver 2 receives PDU 3 (SN=3) prior to receiving the status report 1 11. In addition, a new status report 2 12 is transmitted to transceiver 1 10 indicating that SN=1, 3, 4, 5 are ACKed but SN=2 is NACKed. Status report 2 12 is received prior to receiving status report 1 11 although status report 1 11 is an older status. Thus in this scenario, the transmitter 1 30 first assumes that transceiver 2 has received PDU 3 (SN=3) correctly since previously acquired NACKed sequence number(s) from status report 2 is in this case SN=2. However, receiving status report 1 will now trigger the retransmission of both PDU 2 (SN=2) and PDU 3 (SN=3), since both are NACKed in this report. This is shown in FIG. 2 where transceiver 1 30 retransmits PDU 2 and PDU 3 due to status report 1 even tough PDU 3 was previously received and PDU 3 was retransmitted due to status report 2. It should be noted that the reason for the retransmission of PDU 3 so early, i.e. prior to the reception of any report, could be for example the reception of a HARQ failure indication from the local MAC transmitter at transceiver 1 30. Alternatively, the retransmission of PDU 3 could have been based on a previous status message or report (not illustrated in FIG. 1).

The scenario depicted in FIG. 2 causes the retransmission of PDUs although these were previously ACKed by the receiver (i.e. transceiver 2 10). Thus the scenario of FIG. 2 leads to waste of resources due to the above mentioned retransmissions.

In the following, it is described in conjunction with different embodiments of the present invention, how to prevent/prohibit/stop the retransmission of previously ACKed PDUs thus reducing the amount of retransmission attempts and reducing the unnecessary waste of resources.

Figure 3A:
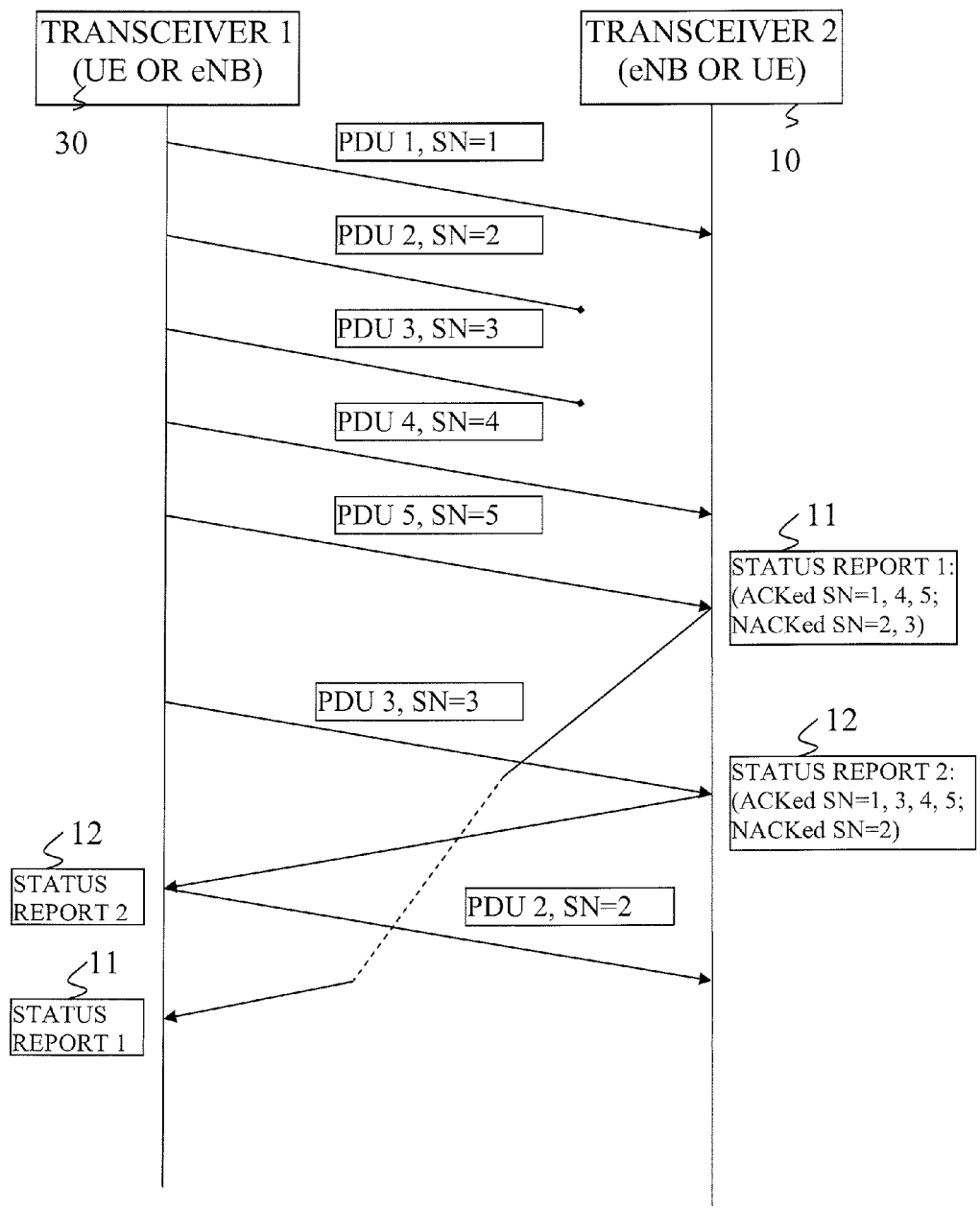
FIG. 3A is a flow diagram of a system including a first transceiver (user equipment or eNB) and second transceiver (eNB or user equipment), where PDUs are exchanged between the transceivers, according to an exemplary embodiment of the present invention.

Referring to FIG. 3A, there is illustrated an exemplary scenario in accordance with an exemplary embodiment of the present invention. Also in this scenario, it is assumed that transceiver 1 has previously acquired information from one or several status reports concerning ACKed and NACKed SNs (or corresponding data PDUs) and thus in a transmitter buffer of transceiver 1 it is indicated (or marked) which data PDUs that have been ACKed and NACKed. Note that in FIG. 3A, only two reports are used for easier understanding of different exemplary embodiments of the present invention.

Referring back to FIG. 3A, it is shown that a current received status PDU report 1 11 comprises information on ACKed PDUs identified by sequence numbers i.e. SN=1, SN=4 and SN=5; and NACKed PDU identified by SN=2 and SN=3. As shown, PDU 3 (SN=3) is received before transceiver 1 30 has acquired status information concerning NACKed and ACKed SNs from status report 2 12. However and according to an exemplary embodiment of the present invention, when transceiver 1 30 receives status report 1, which is an older but delayed report, it checks for all sequence numbers in report 1 11, which sequence numbers are NACKed (or NACKed PDUs) and compares these with previously acquired ACKed sequence numbers (or ACKed PDUs) from earlier status report(s), which in this example corresponds to information from earlier status report 2 12. The transceiver 1 30 then prevents/ignores/prohibits the retransmission of any NACKed PDU (or NACKed SN) that was previously ACKed in a previous report (in this case report 2). The transceiver 1 30 thus only needs to retransmit PDUs not previously received by the transceiver 2 10. This is illustrated in FIG. 3A where PDU 2 and PDU 3 are retransmitted only once. Thus, the scenario depicted in FIG. 3A leads to a reduction in retransmissions compared to the one depicted in FIG. 2. A reduction in unnecessary waste of radio resources is therefore achieved using the above described exemplary embodiment of the present invention. Note that since the waste of radio resources is reduced, the amount of interference that retransmissions may cause according to the prior art, is also reduced.

Figure 3B:
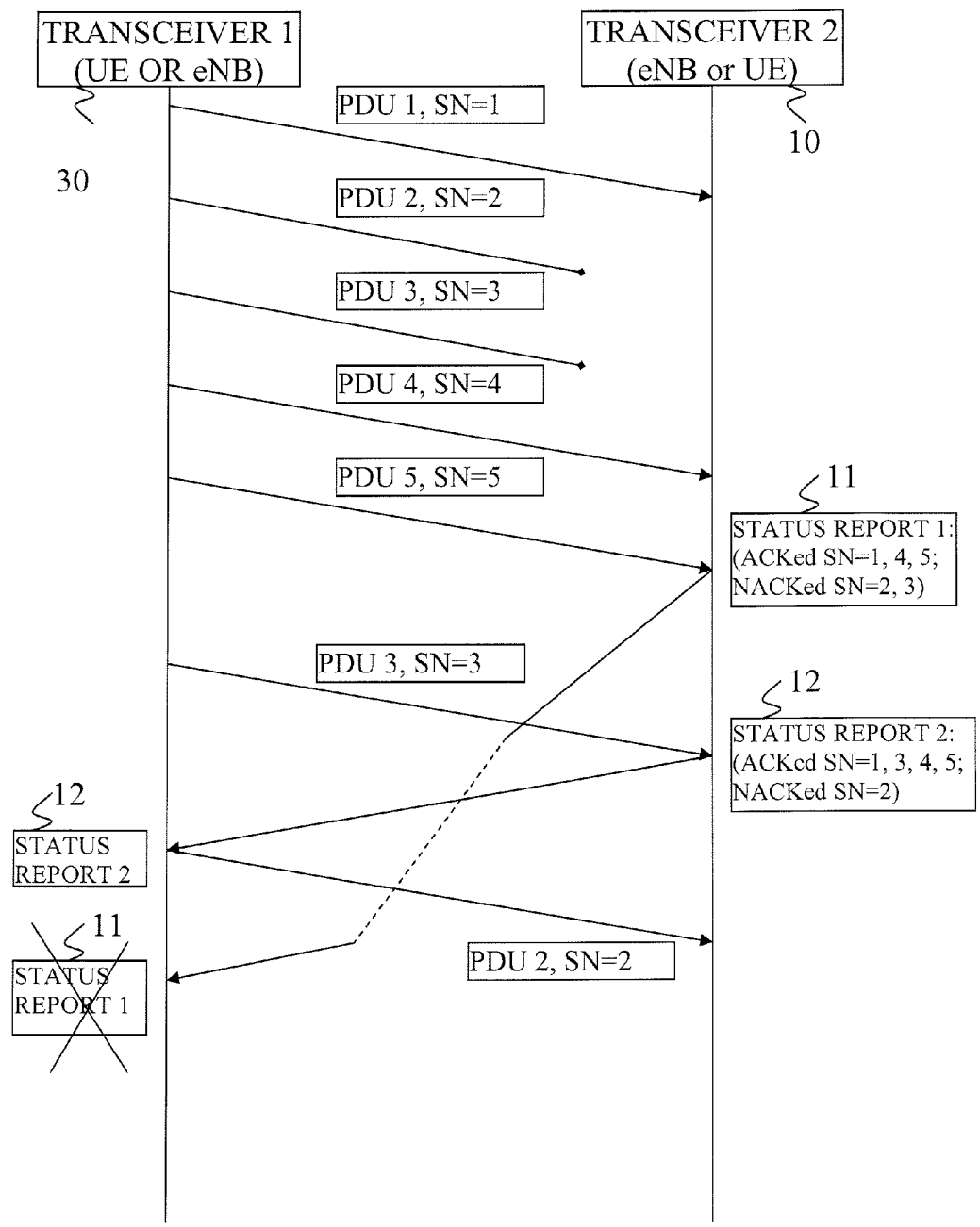
FIG. 3B is a flow diagram of a system including a first transceiver (user equipment or eNB) and second transceiver (eNB or user equipment), where PDUs are exchanged between the transceivers, according to another exemplary embodiment of the present invention.

FIG. 3B illustrates another scenario in according with another exemplary embodiment of the present invention. In this scenario, transceiver 1 30 deletes or discards status PDU report (or message) 1 11 by identifying the report as delayed when it compares, as described above, NACKed PDUs in status report 1 11 with previously acquired ACKed and NACKed SNs from previous report(s) (e.g. report 2 12) and determines that there exit NACKed PDUs indicated in report 1 11 that were previously ACKed. It should be noted that the transceiver 1 30 is configured to store or accumulate status information (on PDUs) of received acceptable status reports so that the previously acquired information from earlier reports can be compared with ACKed SNs and NACKed SNs indicated in a currently received status report and based on the comparison decides on retransmissions.

Figure 3C:
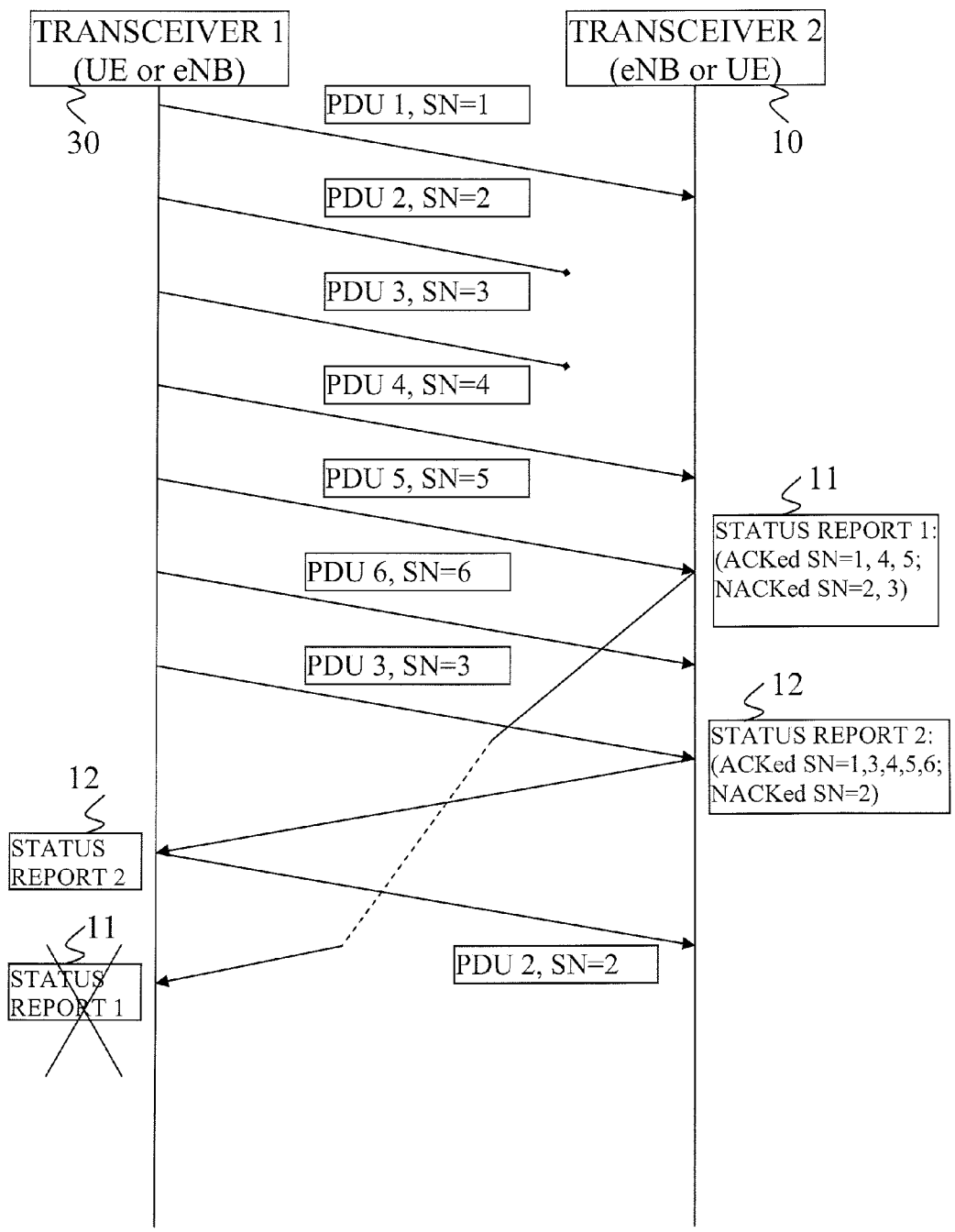
FIG. 3C is a flow diagram of a system including a first transceiver (user equipment or eNB) and second transceiver (eNB or user equipment), where PDUs are exchanged between the transceivers, according to yet another exemplary embodiment of the present invention.

Referring to FIG. 3C there is illustrated another scenario in accordance with yet another exemplary embodiment of the present invention. In this scenario, it is assumed that transceiver 1 30 has also transmitted PDU 6, SN=6 to transceiver 2 10 as shown in FIG. 3C. The status PDU report 2 12 previously indicated that PDUs (or SNs) up to SN=6 have been ACKed, and only SN=2 has been NACKed, so the transceiver 1 30 has in its buffer status marked that PDUs (or SNs) up to SN=6 have been ACKed and SN=2 has been NACKed. However, in this scenario a status PDU report 1 11 is received from transceiver 2 10, indicating that PDUs or SNs up to SN=5 are ACKed and SN=2 and SN=3 are NACKed.

In this exemplary embodiment, the transceiver 1 30 is configured to delete or discard status PDU report (or message) 1 11 by identifying the report as delayed by comparing the highest ACKed sequence number (or PDU) in the report 1 with the highest ACKed sequence number (or PDU) previously acquired from previous reports which in this example corresponds to report 2 and determines that the newly received status report (report 1 11) has a lower highest received ACKed SN (SN=5) than the highest ACKed SN (SN=6) in earlier status report 2 12. Transceiver 1 30 may also delete the report 1 at once and not care about NACKs indicated in report 1. It should be noted that with higher SN (or smaller SN) is meant the relative position of the SN in the transmitting window of the transceiver. Note also that because of the wrap around of the windrow, the higher number inside the transmitter window might be a smaller value.

According to another embodiment of the present invention, after determining which data PDUs that where previously ACKed but are identified as NACKed in the delayed report (status report 1 11), transceiver 1 30 is configured to release any memory resource used for storing previously ACKed PDUs. In other words, the transceiver 1 30 is configured to release the memory used for storing previously (positively) ACKed PDUs (and/or ACKed SN) in its RLC transmitter window whenever a status report is received from the transceiver 2 10.

As mentioned earlier, a transceiver in accordance with the exemplary embodiments of the present invention can be a radio base station, i.e. a eNB or a node B, or it can be a UE. Furthermore, the transceiver is configured to be a RLC transceiver that can support HARQ protocol and/or ARQ protocol.

Figure 4:
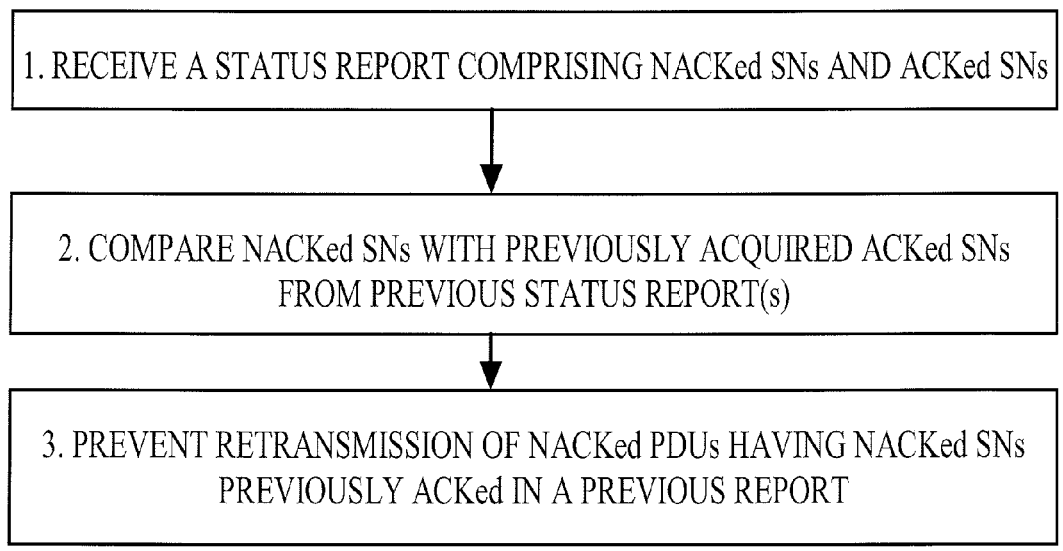
FIG. 4 is a diagram illustrating a flowchart of a method according to exemplary embodiments of the present invention.

Referring to FIG. 4 there is illustrated a flowchart of a method in accordance with the above described embodiments of the present invention. The method comprises the following main steps performed by a transceiver (eNB or UE) capable in exchanging PDUs and control information with another transceiver (UE or eNB), each PDU being identified using a sequence number (SN). As shown in FIG. 4, the method comprises the main steps of:
(1) receiving a status report i.e. a status PDU comprising for each NACKed PDU a corresponding NACKed SN and for each ACKed PDU a corresponding ACKed SN.
(2) comparing each NACKed SN with previously acquired ACKed SNs from previous status PDU report(s); and
(3) preventing or prohibiting or discarding or ignoring the retransmission of each NACKed PDU that have already been ACKed in a previous report.

As mentioned earlier, the transceiver (UE or eNB) is also configured to perform the following method steps (not shown in FIG. 4), in accordance with exemplary embodiments of the present invention:

retransmitting each NACKed PDU not previously indicated as ACKed in a previous report, i.e. each NACKed PDU having a SN not previously ACKed.

discarding the status report if it comprises at least one NACKed SN that has been previously ACKed in a previous report.

releasing any memory resource associated with each NACKed PDU having a NACKed SN that has already been previously ACKed in a previous report. As described earlier in accordance with an embodiment of the present invention, the releasing of the memory resource(s) that was used for storing previously ACKed PDUs (and/or ACKed SN) in the transmitter window of the transceiver is performed whenever a status report is received.

comparing the highest ACKed SN indicated in the status report with the highest ACKed SN in a previous report and discarding the status report if the highest ACKed SN in the status report is lower than the highest ACKed SN in the previous report.

Figure 5:
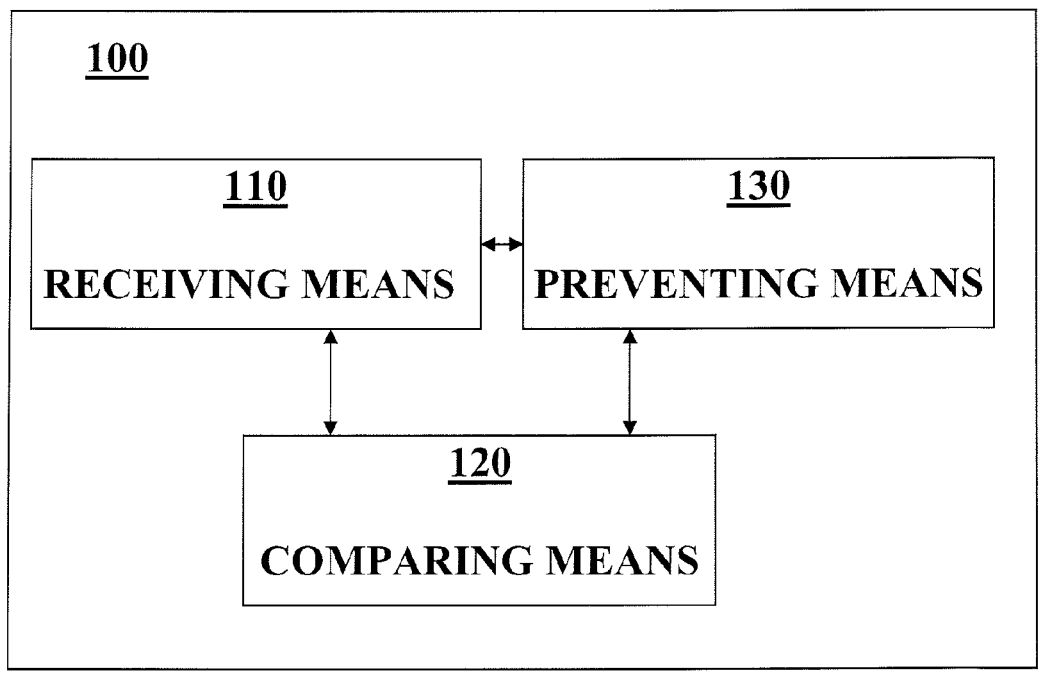
FIG. 5 illustrates a block diagram of an exemplary transceiver according to embodiments of the present invention.

Referring to FIG. 5 there is illustrated a block diagram of an exemplary transceiver acting as a UE or acting as a eNB (or Node B or radio base station) and being configured to perform at least the main steps and the additional steps presented above. As shown, the transceiver 100 comprises a receive circuit 110 configured to receive a status report from another transceiver (not shown). The report indicates for each NACKed PDU a corresponding NACKed SN. The report also indicates for each ACKed PDU a corresponding ACKed SN. Transceiver 100 also comprises a comparing circuit 120 configured to compare each NACKed SN with previously ACKed SNs from previously received status PDU report(s). Transceiver 100 also comprises a preventing circuit 130 configured to prevent the retransmission of each NACKed PDU that was previously indicated as ACKed in a previous report. The different circuits illustrated in FIG. 5 are not necessarily separated but can be in one or several blocks. Furthermore, transceiver 100 may further comprise a retransmission circuit configured to each NACKed PDU having a NACKed SN not previously ACKed in a previous status PDU report. Transceiver 100 may also comprise a discarding circuit configured to discard the status PDU report if the report indicated that at least one NACKed SN has already been ACKed in a previous report. Transceiver 100 is further configured to comprise memory . Transceiver 100 is also configured to release any memory resource associated with each NACKed PDU having a NACKed SN that has already been ACKed in a previous report. Note that the comparing circuit 120 of transceiver 100 is also configured to compare the highest ACKed SN indicated in the received report with the highest ACKed SN indicated in a previous report and the discarding circuit is configured to discard the status report if the highest ACKed SN in the report is lower than the highest ACKed SN in a previous report. Note that transceiver 100 may further include others circuits not illustrated or discussed above.

The present invention and its embodiments can be realised in many ways. For example, one embodiment of the present invention includes a computer-readable medium having instructions stored thereon that are executable by a transceiver of a telecommunications system, acting as a user equipment or a eNB (or base station). The instructions executable by the transceiver and stored on a computer-readable medium perform the method steps of the present invention as set forth in the claims.

While the invention has been described in tennis of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method in a transceiver of a telecommunications system wherein protocol data units (PDUs), are exchanged between the transceiver and another transceiver, each PDU being identified by a PDU sequence number, said method comprising:
receiving a status report from the other transceiver, said report comprising, for each negatively acknowledged (NACKed) PDU, a corresponding NACKed PDU sequence number and further comprising, for each acknowledged (ACKed) PDU, a corresponding ACKed PDU sequence number;
comparing each NACKed PDU sequence number indicated in the status report with previously acquired ACKed PDU sequence numbers from at least one previous status report; and
while continuing to process additional status reports received from the other transceiver and without halting any pending PDU transmissions to the other transceiver:
preventing retransmission of each NACKed PDU having a NACKed PDU sequence number that has already been ACKed in a previous status report; and
discarding said status report if it comprises at least one NACKed PDU sequence number that has already been ACKed in a previous status report.

2. The method according to claim 1 further comprising, while continuing to process additional status reports received from the other transceiver and without halting any pending PDU transmissions to the other transceiver, releasing any memory resource associated with each NACKed PDU having a NACKed PDU sequence number that has already been ACKed in a previous status report.

3. The method according to claim 1 further comprising comparing the highest ACKed PDU sequence number indicated in the status report with the highest ACKed PDU sequence number indicated in a previous status report and, while continuing to process additional status reports received from the other transceiver and without halting any pending PDU transmissions to the other transceiver, discarding the status report if the highest ACKed PDU sequence number in the status report is lower than the highest ACKed PDU sequence number in a previous status report.

4. The method according to claim 1 wherein the transceiver is a user equipment (UE) and the other transceiver is a radio base station or an evolved Node B (eNB).

5. The method according to claim 1, wherein the transceiver is a radio base station or an evolved Node B (eNB) and the other transceiver is a user equipment (UE).

6. The method according to claim 1, wherein each PDU corresponds to a radio link control, RLC, PDU and wherein said status report and said at least one previous status report are control PDUs or STATUS PDUs.

7. The method according to claim 1, wherein a NACKed PDU corresponds to a PDU that is non-properly received or non-received by the other transceiver and a ACKed PDU corresponds to a PDU that is correctly received by the other transceiver.

8. A transceiver of a telecommunications system wherein protocol data units (PDUs) are exchangeable between the transceiver and another transceiver, each PDU being identified by a PDU sequence number, said transceiver comprising:
a receive circuit configured to receive a status report from the other transceiver, said status report comprising, for each negatively acknowledged (NACKed) PDU, a corresponding NACKed PDU sequence number and further comprising, for each acknowledged (ACKed) PDU a corresponding ACKed PDU sequence number;
a comparing circuit configured to compare each NACKed PDU sequence number indicated in the status report with previously acquired ACKed PDU sequence numbers from at least one previous status report;
a preventing circuit and a discarding circuit respectively configured, while the transceiver continues to process additional status reports received from the other transceiver and without the transceiver halting any pending PDU transmissions to the other transceiver, to prevent retransmission of each NACKed PDU having a NACKed PDU sequence number that has already been ACKed in a previous status report and to discard said status report if it comprises at least one NACKed PDU sequence number that has already been ACKed in a previous status report.

9. The transceiver according to claim 8 wherein the transceiver is configured, while continuing to process additional status reports received from the other transceiver and without halting any pending PDU transmissions to the other transceiver, to release any memory resource associated with each NACKed PDU having a NACKed PDU sequence number that has already been ACKed in a previous status report.

10. The transceiver according to claim 8 wherein the comparing circuit is further configured to compare the highest ACKed PDU sequence number indicated in the status report with the highest ACKed PDU sequence number indicated in a previous status report and wherein the discarding circuit is further configured, while continuing to process additional status reports received from the other transceiver and without halting any pending PDU transmissions to the other transceiver, to discard the status report if the highest ACKed PDU sequence number in the status report is lower than the highest ACKed PDU sequence number in a previous status report.

11. The transceiver according to claim 8, wherein the transceiver is a user equipment (UE).

12. The transceiver according to claim 8, wherein the transceiver is radio base station or an evolved Node B (eNB).

13. The transceiver according to claim 8, wherein each PDU corresponds to a radio link control, RLC, PDU and wherein said status report and said at least one previous status report are control PDUs or STATUS PDUs.

14. The transceiver according to claim 8, wherein a NACKed PDU corresponds to a PDU that is non-properly received or non-received by the other transceiver and a ACKed PDU corresponds to a PDU that is correctly received by the other transceiver.

* * * * *